United States Patent
Turner

(10) Patent No.: US 7,380,805 B1
(45) Date of Patent: Jun. 3, 2008

(54) GO-CART

(75) Inventor: David Turner, Augusta, GA (US)

(73) Assignee: Asian Ventures, Inc., Augusta, GA (US)

( * ) Notice: Subject to any disclaimer, the term of this patent is extended or adjusted under 35 U.S.C. 154(b) by 130 days.

(21) Appl. No.: 11/297,795

(22) Filed: Dec. 8, 2005

Related U.S. Application Data

(60) Provisional application No. 60/634,158, filed on Dec. 8, 2004.

(51) Int. Cl.
*B60G 3/18* (2006.01)

(52) U.S. Cl. .................. 280/124.135; 280/124.13; 280/124.15

(58) Field of Classification Search ............ 180/291; 280/124.109, 124.134, 124.135, 124.136, 280/124.138, 124.15
See application file for complete search history.

(56) References Cited

U.S. PATENT DOCUMENTS

| | | | | |
|---|---|---|---|---|
| 4,641,854 A * | 2/1987 | Masuda et al. | ............. | 180/385 |
| 4,799,708 A | 1/1989 | Handa et al. | ............... | 280/796 |
| 5,498,019 A | 3/1996 | Adato | ................ | 280/124.136 |
| 5,855,386 A | 1/1999 | Atkins | .................. | 280/124.111 |
| 5,961,135 A | 10/1999 | Smock | .................. | 280/124.11 |
| 6,123,351 A * | 9/2000 | Bruehl | ............... | 280/124.135 |
| 6,189,904 B1 * | 2/2001 | Gentry et al. | ......... | 280/124.175 |
| 6,302,420 B1 * | 10/2001 | Sano | .................... | 280/124.134 |
| 6,752,409 B1 * | 6/2004 | Kunert | ............... | 280/124.138 |
| 7,150,462 B2 * | 12/2006 | Bortz et al. | ........... | 280/124.125 |
| 2001/0028156 A1 * | 10/2001 | Handa | .................... | 280/93.512 |
| 2004/0201196 A1 * | 10/2004 | Katagiri et al. | ........ | 280/124.134 |
| 2005/0200094 A1 * | 9/2005 | Hozumi | ............... | 280/124.135 |
| 2005/0288151 A1 * | 12/2005 | Yamamoto | .................. | 477/110 |
| 2007/0023566 A1 * | 2/2007 | Howard | ......................... | 244/2 |
| 2007/0074925 A1 * | 4/2007 | Seki et al. | .................. | 180/374 |

* cited by examiner

*Primary Examiner*—Toan To
(74) *Attorney, Agent, or Firm*—Alfred J. Mangels

(57) ABSTRACT

A four-wheeled recreational vehicle in the form of a go-cart having an open body without doors or windows. The body is formed from interconnected tubular members to define a chassis and frame. The vehicle includes a front suspension having V-shaped, parallel upper and lower control members including forward and rear control arms. The forward control arms are substantially perpendicular to the chassis centerline and the rear control arms incline inwardly and rearwardly from the front wheels. Greater vertical front wheel travel is provided for improved ride comfort and stability over rough terrain. The accelerator and brake pedals are placed closer to the front wheel pivot axis for greater legroom.

8 Claims, 6 Drawing Sheets

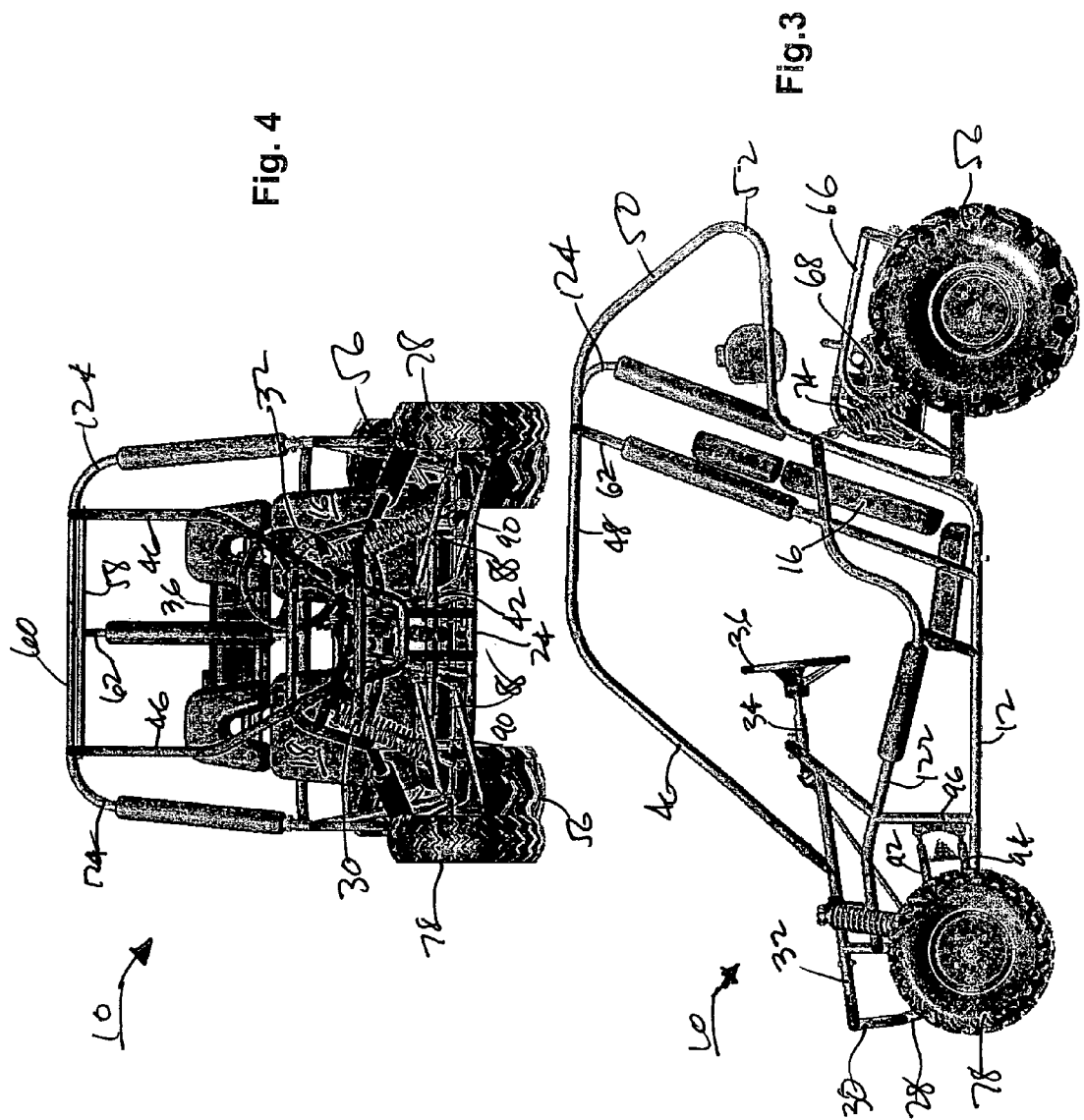

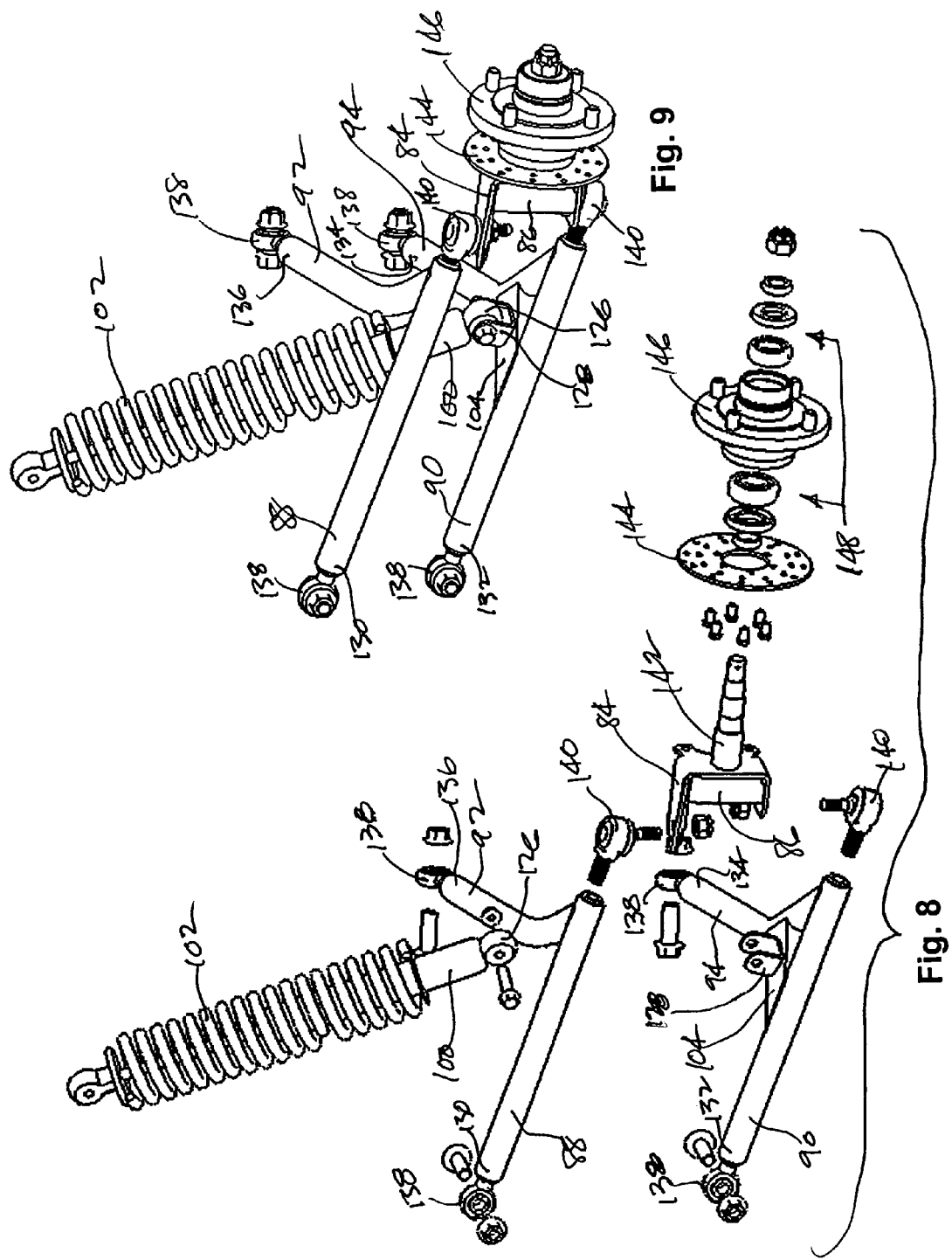

GO-CART

CROSS-REFERENCE TO RELATED APPLICATION

This application claims the benefit of U.S. Provisional Application Ser. No. 60/634,158, filed on Dec. 8, 2004.

BACKGROUND OF THE INVENTION

1. Field of the Invention

The present invention relates to an off-road, four-wheeled recreational vehicle of the type sometimes referred to as a go-cart. More particularly, the present invention relates to an improved go-cart having a relatively short wheelbase, a compact overall structure, good handling and maneuverability, along with greater legroom than is available in many currently available compact go-carts.

2. Description of the Related Art

Go-carts of various configurations are known. Generally, such vehicles have a substantially open, tubular frame structure, three or four wheels, and one or two seats. Known vehicles of that type have either a short vertical travel front suspension system for a low-slung, generally shorter and narrower vehicle, or a high vertical travel front suspension system for a taller, generally longer and wider vehicle. Greater suspension travel is desirable to provide improved ride comfort and stability on rough terrain. Additionally, the shorter and narrower vehicles generally have limited legroom, which limits the size of the operator who can comfortably operate the vehicle, thereby limiting the potential market for it. On the other hand, the longer and wider vehicles are generally too large for convenient and economical shipment at a sufficient vehicle density in standard cargo containers of the type utilized in over-ocean shipments. Such vehicles also require larger storage spaces in user-owned facilities, such as personal garages.

There is therefore a need for a compact go-cart that accommodates two persons and that has a suspension system that enables a higher degree of front wheel vertical travel for improved off-road performance, improved maneuverability, and improved occupant comfort over widely varying terrain surfaces. Additionally, it is desirable to provide a compact go-cart structure that has a relatively short wheelbase while at the same time providing sufficient front legroom to comfortably accommodate a wide range of drivers of different sizes, from youths to adults. The present invention satisfies those needs and desires.

SUMMARY OF THE INVENTION

Briefly stated, in accordance with one aspect of the present invention, a compact, four-wheel, off-road, recreational vehicle is provided. The vehicle has a tubular frame, independent front suspension, rear-engine, rear-wheel drive, and seating to accommodate two persons. The front suspension includes generally V-shaped upper and lower control arms that have a length that permits greater vertical front wheel travel. The vehicle length and width are minimized. Material cost, shipping cost, required storage space, and maneuverability are improved. Additionally, the front suspension system and vehicle frame structure enable the accelerator and brake pedals to be positioned to provide longer legroom for both driver and passenger.

BRIEF DESCRIPTION OF THE DRAWINGS

The structure, operation, and advantages of the present invention will become further apparent upon consideration of the following description, taken in conjunction with the accompanying drawings in which:

FIG. 3 is a left side view of view of the go-cart embodiment shown in FIG. 1;

FIG. 4 is a front view of the go-cart embodiment shown in FIG. 1;

FIG. 8 is a fragmentary, perspective view of the driver's side front suspension system, in exploded form; and FIG. 9 is a fragmentary, perspective view of the driver's side front suspension system, in assembled form.

DESCRIPTION OF THE PREFERRED EMBODIMENTS

Figure 1:
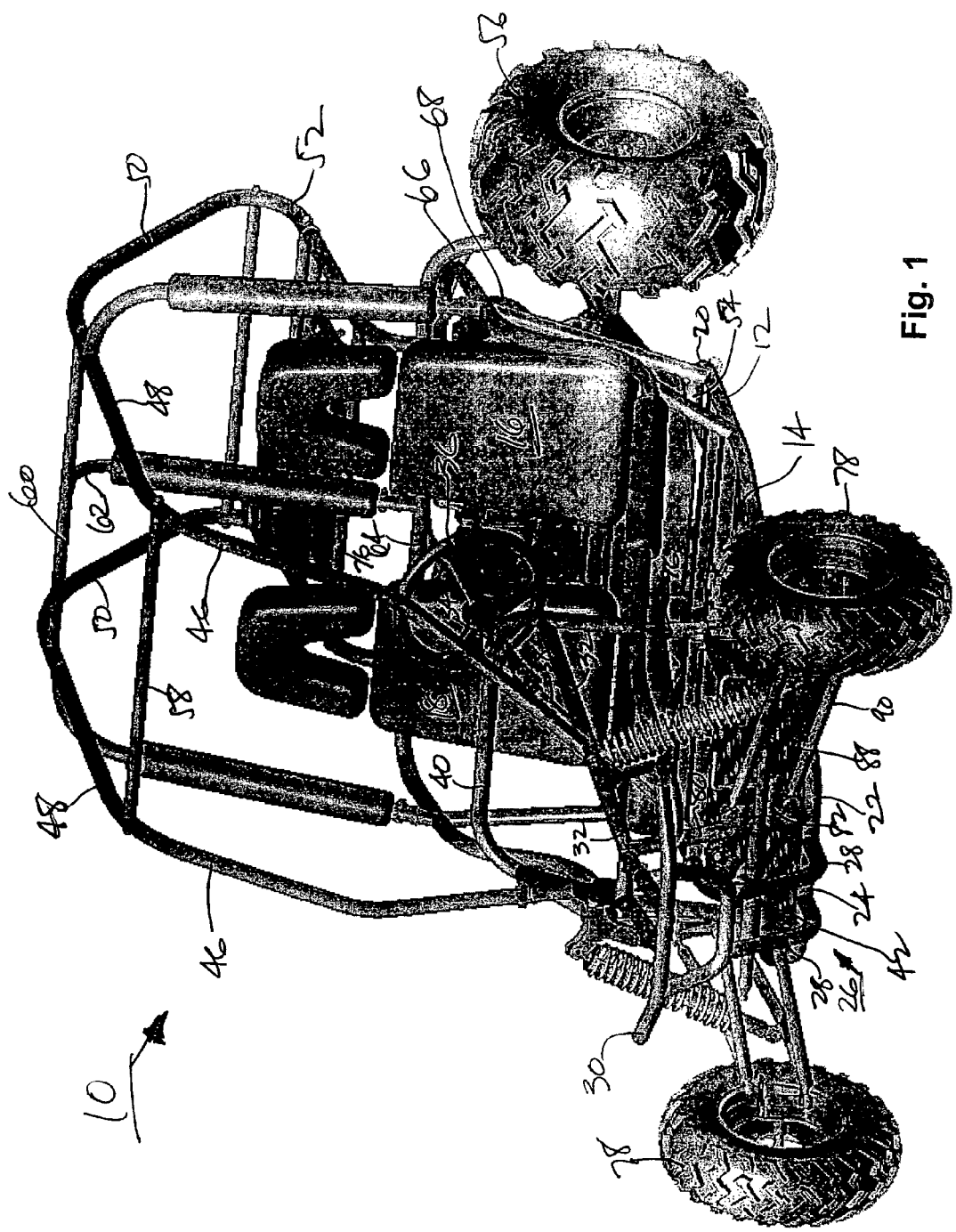
FIG. 1 is a left side front perspective view of an embodiment of a go-cart.

Referring now to the drawings, and particularly to FIGS. 1 through 5 thereof, there is shown a vehicle 10 in the form of a two-person go-cart. The vehicle is a four-wheeled, rear drive, gasoline-engine-powered vehicle having an open, tubular frame body structure. The body structure is formed from a number of interconnected frame sections that are defined by tubular steel members.

The body structure includes a base frame 12, to which a floor pan 14 is attached, such as by welding, or the like, and which supports a pair of side-by-side seats, a driver's seat 16 and a passenger's seat 18, each having a seat section and a backrest section. Base frame 12 includes a generally rectangular rear base frame section 20, on which seats 16 and 18 are mounted for fore and aft movement, and a trapezoidal front base frame section 22 that extends forwardly of rear base frame section 20. The shorter base 24 of front base frame section 22 is at the front end of vehicle 10. Floor pan 14 is secured to and carried by the front base frame section 22, such as by welding, or the like, and the forward end of front base frame section 22 includes a bumper structure 26 in the form of a pair of parallel, forwardly and upwardly extending bumper support bars 28 that extend from shorter base 24 of front base frame section 22 and terminate in a laterally extending bumper member 30.

Figure 5:
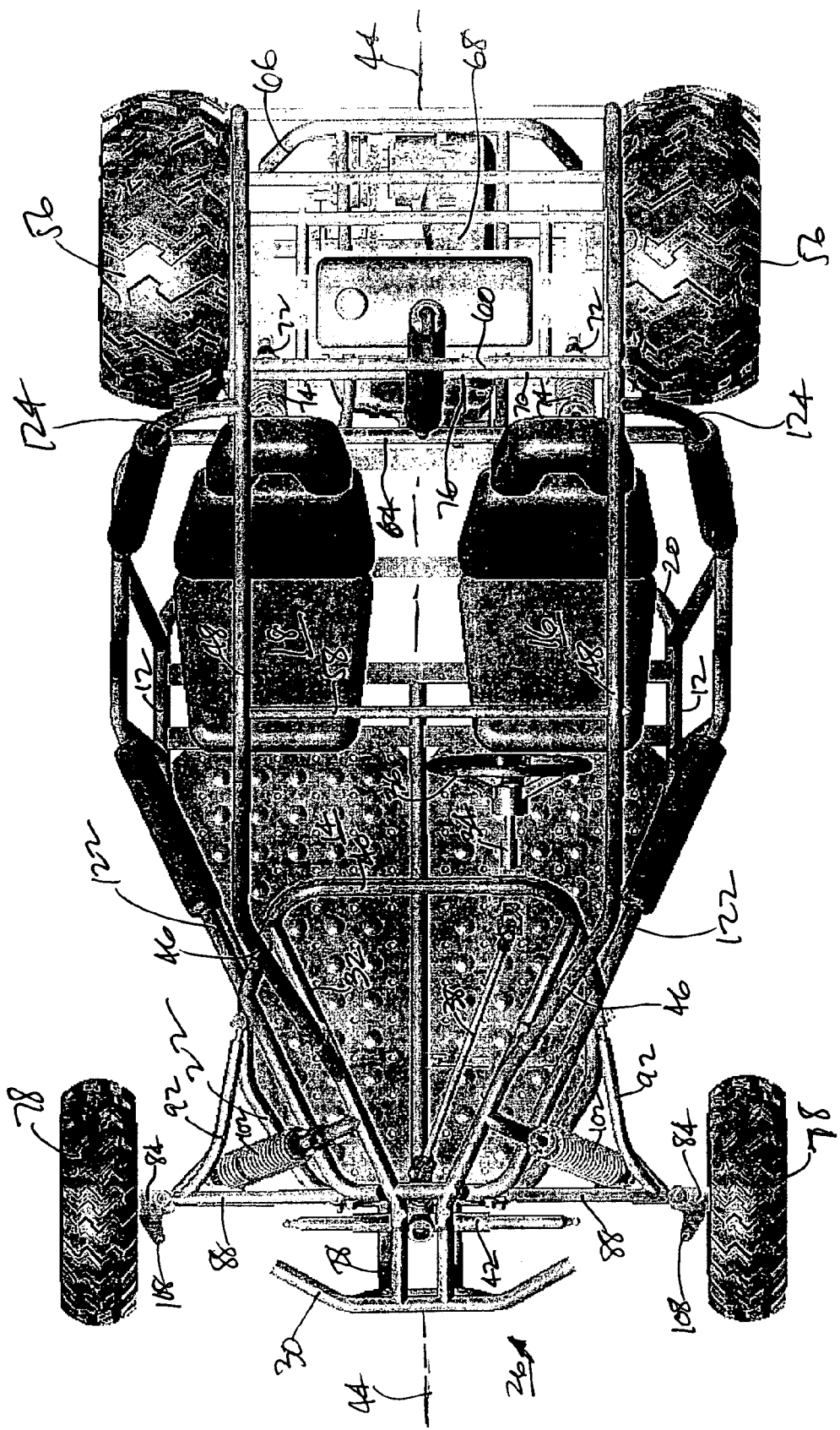
FIG. 5 is a top view of the go-cart embodiment shown in FIG. 1.

Extending in a rearward and upwardly angled direction from bumper member 30 is a trapezoidally-shaped front support frame 32. As best seen in FIGS. 3 and 5, a steering column 34 that extends from a steering wheel 36 to one end of a steering control link 38 is suitably supported from cross member 40 of front support frame 32. The other end of steering control link 38 is operatively connected with a rack and pinion steering mechanism 42 that is rigidly secured to bumper support bars 28. Each end of steering control link 38 includes a universal joint to allow steering column 34 to be laterally offset from the center of steering mechanism 42, and from the vehicle longitudinal centerline 44, as seen in FIGS. 3 and 5.

As best seen in FIGS. 1 and 3, each side of vehicle 10 includes a generally loop-shaped side frame 46 that extends from the front toward the rear of the vehicle. Side frames 46 each extend in a rearward and upwardly sloping direction from front support frame 32 to a substantially horizontal intermediate section 48, then to a rearwardly and downwardly sloping rear section 50, to a reverse bend 52 and down to rear crossbar 54 of base frame 12. Side frames 46 are substantially parallel to vehicle longitudinal centerline 44 and to each other, as seen in FIG. 5, and they define respective vehicle side planes that lie between the vehicle centerline and the center planes of each of respective rear wheels 56. Between each of side frames 46 is a forward upper crossbar 58 and a rear upper crossbar 60 to define an open roof and to provide rigidity to the upper section of the vehicle framework for rollover protection. An upwardly and rearwardly sloping support bar 62 extends from substantially the center of a base frame rear crossbar 64 to rear upper crossbar 60.

Positioned between the planes defined by side frames 46 is an engine support frame 66 that carries an engine/transaxle drive assembly 68 from which respective drive axles (not shown) extend laterally outwardly and are operatively coupled with rear wheels 56 for propelling vehicle 10 over the ground. A forward crossbar 70 of engine support frame 66 is pivotally coupled with base frame 12 rear crossbar 64. A pneumatic or hydraulic shock absorber 72 with a surrounding coaxial coil spring 74 extends between a rear crossbar 76 interconnecting side frames 46 and a bracket (not shown) carried on the axle housings of each of rear wheels 56 for resiliently supporting the engine/transaxle assembly 68 and rear drive wheels 56 in cantilever fashion relative to the frame of vehicle 10.

Figure 6:
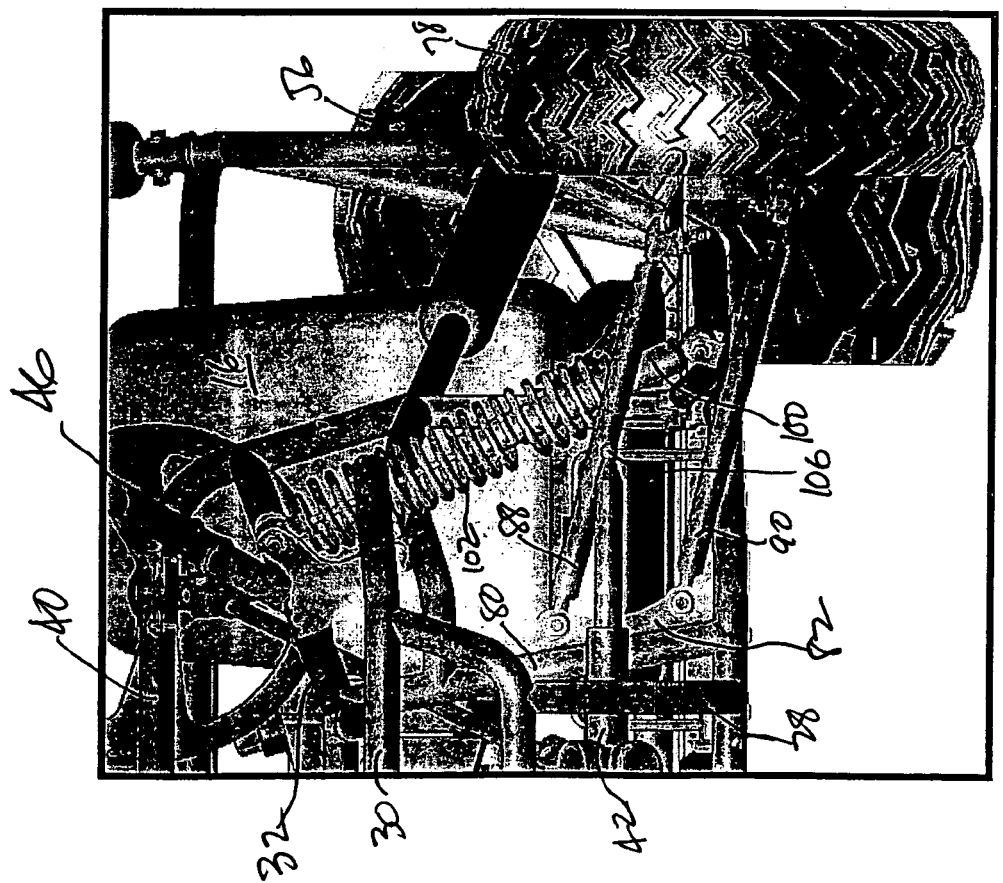
FIG. 6 is an enlarged, fragmentary front elevational view of the left front wheel suspension system of the go-cart embodiment shown in FIG. 1.

Each of front wheels 78 is independently suspended from and carried by the vehicle frame. Referring to FIGS. 6 through 9, which although showing only the left front wheel area, also apply to the right front wheel area in that similar elements are provided in the same relative relationship. An upwardly-extending, inwardly-inclined suspension forward support bar 80 extends from front base frame member 22 to front support frame 32 on each side of vehicle longitudinal centerline 44 a short distance behind bumper member 30. A suspension inner support bracket 82 is rigidly affixed to each of to suspension forward support bars 80. A suspension outer support bracket 84 is carried by a front wheel axle member 86 that rotatably carries front wheel 78. Extending between and pivotally connected with each of suspension inner support bracket 82 and suspension outer support bracket 86 are a pair of substantially parallel upper and lower front control arms 88, 90, respectively, that are oriented substantially perpendicularly relative to vehicle longitudinal centerline 44 and are inclined inwardly and upwardly from the respective front wheels 78 to the vehicle frame when the vehicle is in an unloaded condition, as shown in FIG. 6.

Figure 2:
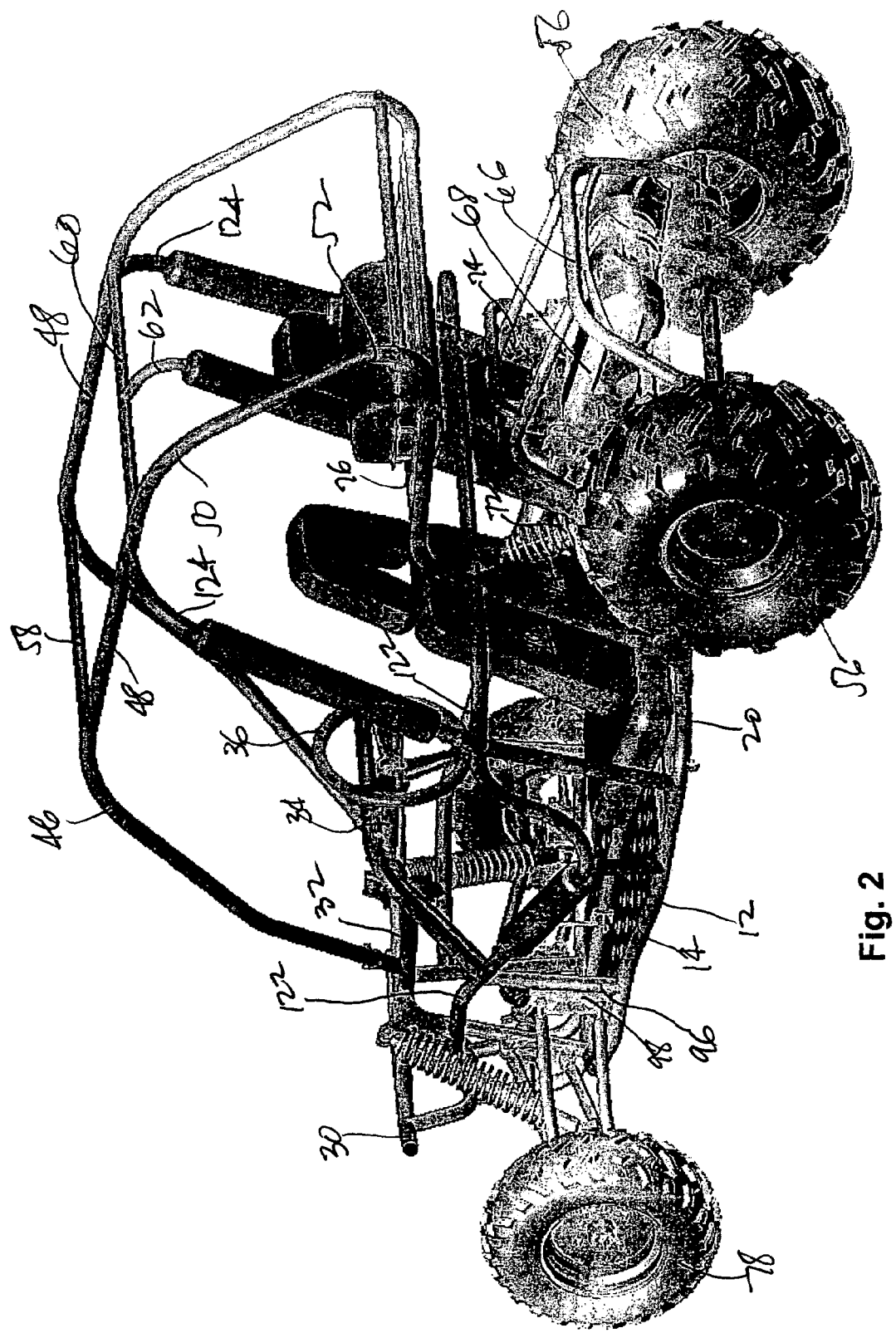
FIG. 2 is a left side rear perspective view of the go-cart embodiment shown in FIG. 1.

Also pivotally extending from respective upper and lower connection points of suspension outer support bracket 84 is a pair of substantially parallel, inwardly and rearwardly extending upper and lower rear control arms 92, 94, respectively. As best seen in FIG. 2, a support bar 96, that extends between and is rigidly affixed at its respective ends to each of base frame 12 and front support frame 32, carries a suspension rear inner support bracket 98 that pivotally receives inner ends of each of upper and lower rear control arms 92, 94. Furthermore, as is apparent from FIGS. 5, 7, and 8, upper and lower rear control arms 92, 94, respectively, are each J-shaped, with the bend of the J facing inwardly toward vehicle longitudinal centerline 44, to minimize interference with the distance to which each of front wheels 78 of the vehicle can be turned about a vertical axis in a steering maneuver, and thereby reduce the minimum turning circle radius of the vehicle for improved maneuverability.

Figure 7:
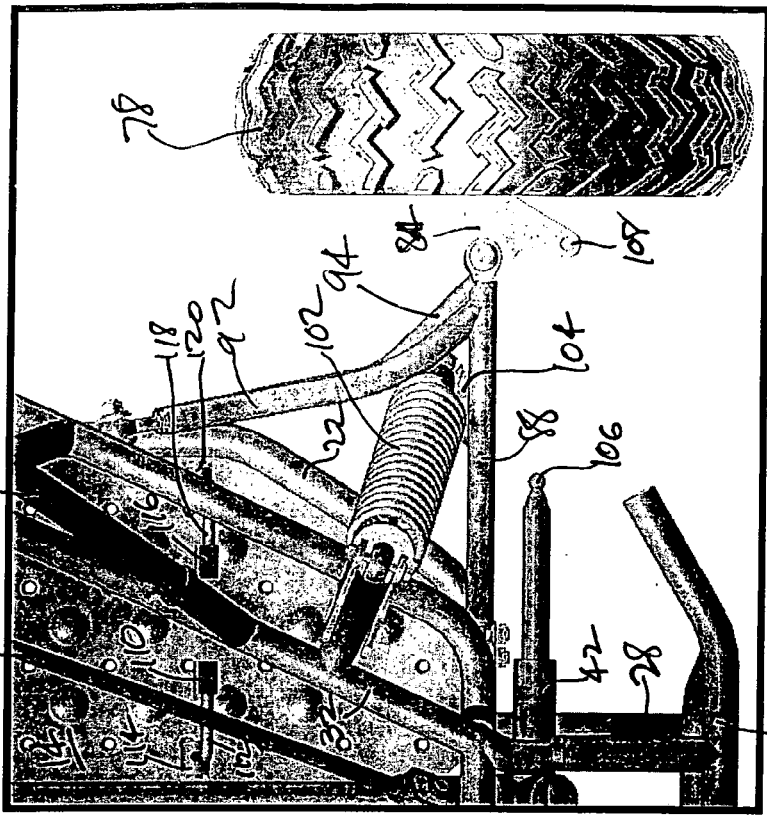
FIG. 7 is an enlarged, fragmentary top elevational view of the left front wheel suspension system of the go-cart embodiment shown in FIG. 1.

A pneumatic or hydraulic front shock absorber 100 and a surrounding coaxial coil spring 102 is connected between front support frame 32 and a crossbar 104 extending between and interconnecting lower front control arm 90 and lower rear control arm 94, as best seen in FIGS. 6 and 7. Because of the relatively long lengths of the respective front suspension control arms, a significant amount of vertical wheel travel can be accommodated, thereby providing more comfortable riding and improved vehicle stability when driving the vehicle over uneven terrain.

FIGS. 8 and 9 are fragmentary perspective views of the driver's side front suspension structure. Although not shown, it should be understood that the passenger's side front suspension structure is the mirror image of the driver's side structure. FIG. 8 shows the structure in exploded form and FIG. 9 shows the structure in its assembled form. As shown, the lower end 126 of shock absorber 100 is connected with a clevis 128 that can be welded to crossbar 104 and that allows pivotal movement of the lower end of shock absorber 100 relative to crossbar 104. The innermost ends 130, 132 of front control arms 88, 90, respectively, and the innermost ends 134, 136 of rear control arms 90, 92, respectively, are each connected with the cart frame by means of respective eyebolts 138 that are pivotally connected with forward inner support bracket 82 and rear inner support bracket 98, respectively.

The outer ends of each of the upper and lower control arms are connected with outer support bracket 84 through respective ball joints 140. Outer support bracket 84 also rigidly carries an axle 142 that rotatably supports a front wheel. Also rotatably carried by axle 142 are a brake rotor disc 144, a wheel hub 146, and related bearing and seal elements 148.

Although not shown in the drawings, it should be understood that a tie rod extends from each of the rack and pinion steering gear mechanism ends 106 to the respective suspension outer support bracket 84 at a front wheel 78. As is apparent from FIG. 7, the steering connection point 108 at front wheel 78 is offset in a forward direction relative to the vehicle longitudinal axis, from the vertical pivot axis of front wheel 78 and from a transverse vertical plane in which the upper and lower front control arms lie. Further, it should be understood that each of the tie rod ends includes a ball joint connection at the ends of steering gear mechanism 106 and at connection point 108 of outer support bracket 84.

The positions relative to the overall vehicle structure of the foot pedals for operating the vehicle are best seen in FIGS. 5 and 7. An accelerator pedal 110 is provided to the left of and adjacent to vehicle longitudinal centerline 44 and is pivotally supported relative to floor pan 14. Pedal 110 is carried on an accelerator pedal arm 112 that is secured to a sleeve 114 that is rotatably carried on a pivot pin (not shown) that is supported from floor pan 14 in such a way as to allow sleeve 114 to pivot about its own axis. Accelerator pedal 110 is operatively connected with engine/transaxle assembly 68 by a suitable connection means (not shown), such as a cable, or the like, to control the engine speed, and thereby the vehicle speed.

Similarly, a brake pedal 116 is provided to the left of accelerator pedal 110, adjacent to base frame 12, and is also pivotally supported relative to floor pan 14. Pedal 116 is carried on a brake pedal arm 118 that pivots about the axis of sleeve 120 that is rotatably carried on a pivot pin (not shown) that is supported from floor pan 14 in such a way as to allow sleeve 120 to pivot about its own axis. Brake pedal 116 is operatively connected with a suitable vehicle braking system, such as by a mechanical or hydraulic mechanism connected with brake pads carried at the vehicle wheels.

The operator foot contact surfaces of each of pedals 110, 116 can be of the order of about 8½ inches from the axis of rotation of front wheels 78 when the front wheels are in the straight-ahead position. The pivot axes of each of pedal arms 112, 118 can be of the order of about 9¾ inches from the axis of rotation of front wheels 78 when the front wheels are in the straight-ahead position. Such a positioning of the pedal surfaces and the pedal arm pivot axes relative to the rotation axes of the front wheels enables a more compact vehicle structure to be utilized, to facilitate efficient and economical shipping of the vehicles in standard cargo containers, and it also serves to provide sufficient leg room for vehicle operators of different sizes. In that regard, the overall length of a vehicle of the type described herein can be of the order of about 84 inches, to enable efficient placement in cargo containers having an interior length of 87½ inches and an interior width of 50 inches. For a vehicle having an overall length of 84 inches, the front-to-rear wheelbase length can be about 67¼ inches.

As shown in FIGS. 3, 5, 6, and 7, a lower side member 122 extends along each of the driver's and passenger's sides of the vehicle at a height between base frame 12 and forward and rear upper crossbars 58, 60 that define a roof frame. Side members 122 are attached at their forward ends to respective suspension forward support bars 80 that extend between the forward portion of front support frame 32 and base frame 12. At their rearmost ends each of side members 122 is attached to the side frame structure at a respective roof support member 124. As can be seen in FIG. 5, side members 122 diverge outwardly and rearwardly from the respective suspension forward support bars 80 to a point laterally adjacent the front edges of the respective seats 16, 18, then extend rearwardly substantially parallel to each other to a point laterally adjacent the respective seat back cushions. They then curve inwardly to their connection with the respective roof support member 124.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the present invention.

What is claimed is:

1. A compact, powered, four-wheel recreational vehicle having an open structure without doors or windows, said vehicle comprising:

a) a chassis formed by a plurality of tubular members interconnected to define a rigid body frame, the chassis carrying an engine, a pair of seats, a pair of front wheels, a pair of rear wheels, and operating controls for navigating the vehicle; and b) a front suspension system for supporting the front wheels for vertical movement in response to terrain changes, the suspension system including a pair of parallel, generally V-shaped upper and lower connecting members extending from the chassis to a respective suspension outer support member that rotatable carries a front wheel, each connecting member including a respective forward control arm that lies in a transverse vertical plane that is perpendicular to a vehicle chassis centerline and a respective rear control arm that extends inwardly and rearwardly from the suspension outer support member, wherein outermost ends of the forward and rear control arms are pivotally connected to the suspension outer support member and innermost ends of the forward and rear control arms are pivotally connected to the chassis at a suspension inner support member, and wherein the innermost ends of the upper forward control arms are spaced from the vehicle chassis centerline a shorter distance than the innermost ends of the lower forward control arms.

2. A recreational vehicle in accordance with claim 1, wherein each rear control arm is a non-linear member.

3. A recreational vehicle in accordance with claim 2, wherein each rear control arm includes a bend to define a J-shaped rear control arm, wherein the bend has a center of curvature that lies outwardly of the rear control arm, relative to the vehicle chassis centerline.

4. A recreational vehicle in accordance with claim 3, wherein each forward control arm is inclined inwardly and upwardly from the front wheel toward the vehicle chassis centerline.

5. A recreational vehicle in accordance with claim 1, wherein the operating controls include an accelerator pedal and a brake pedal that are each pivotally supported on a floor pan carried by the chassis, and wherein the pivot axes of the accelerator and brake pedals are within about 10 inches from a front wheel pivot axis.

6. A recreational vehicle in accordance with claim 5, wherein the accelerator and brake pedals have foot contact surfaces that are within about 9 inches from the front wheel pivot axis.

7. A recreational vehicle in accordance with claim 1, wherein the distance between the rear wheels is smaller than the distance between the front wheels.

8. A recreational vehicle in accordance with claim 1, including a vehicle steering mechanism having tie rods that extend outwardly toward respective front wheels, wherein the tie rods are connected with the suspension outer support member and are positioned forwardly of the transverse vertical plane in which the respective upper and lower forward control arms lie.

* * * * *